United States Patent
Kotani et al.

(10) Patent No.: US 7,277,192 B2
(45) Date of Patent: Oct. 2, 2007

(54) PRINTING APPARATUS, PRINTING METHOD, IMAGE PROCESSING APPARATUS, IMAGE PROCESSING METHOD, STORAGE MEDIUM, AND PROGRAM

(75) Inventors: Takuya Kotani, Kanagawa (JP); Kunihiro Yamamoto, Kanagawa (JP); Kiyoshi Kusama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 927 days.

(21) Appl. No.: 10/357,196

(22) Filed: Feb. 4, 2003

(65) Prior Publication Data

US 2003/0147097 A1 Aug. 7, 2003

(30) Foreign Application Priority Data

Feb. 7, 2002 (JP) ............................ 2002-030847

(51) Int. Cl.
*G06F 17/00* (2006.01)
(52) U.S. Cl. ..................... 358/1.13; 715/527; 715/517; 399/45
(58) Field of Classification Search ............... 358/1.15, 358/1.13, 1.18, 450–453, 1.12; 715/527, 715/517; 399/45
See application file for complete search history.

(56) References Cited

U.S. PATENT DOCUMENTS

| | | | | |
|---|---|---|---|---|
| 6,574,002 B1 * | 6/2003 | Paczewitz | ................... | 358/1.13 |
| 6,616,359 B1 * | 9/2003 | Nakagiri et al. | ............ | 400/582 |
| 6,868,189 B1 * | 3/2005 | Hoshino | ..................... | 382/260 |
| 6,948,792 B2 * | 9/2005 | Narusawa et al. | ............ | 347/19 |
| 7,010,176 B2 * | 3/2006 | Kusunoki | ................... | 382/299 |
| 7,027,172 B1 * | 4/2006 | Parulski et al. | ............ | 358/1.15 |
| 7,161,691 B2 * | 1/2007 | Nakagiri et al. | ............ | 358/1.13 |
| 2001/0056449 A1 * | 12/2001 | Kawamoto et al. | ......... | 707/527 |

\* cited by examiner

*Primary Examiner*—Douglas Q. Tran
*Assistant Examiner*—Chan S. Park
(74) *Attorney, Agent, or Firm*—Fitzpatrick, Cella, Harper & Scinto

(57) ABSTRACT

In conventional technique, a layout result is displayed on only one page, and a print result cannot be roughly observed by reduced display of all pages. For this reason, a specific image printed on a specific page cannot be overlooked, and a user must print the image while imaging an image result. When a user tries to change a layout method in the middle of a printing operation, the user must inconveniently restart the operation. In order to solve the problem, a printing apparatus for printing an image selected from images stored in a storage medium includes an image display unit for displaying the image in the storage medium as a list, a printing object selection unit for selecting an image to be printed with reference to the image display unit, a print medium selection unit for selecting medium on which the image is printed, and a print layout selection unit for selecting an arbitrary layout from layouts depending on the medium selected by the print medium selection unit.

8 Claims, 13 Drawing Sheets

FIG. 12

SETTING

IMAGE
WHEN IMAGE IS ARRANGED PERPENDICULARLY
- ⦿ ROTATE ON LEFT
- ○ ROTATE ON RIGHT

EDIT/EFFECT
- ☑ SAME CONTENTS OF EDIT ARE ALTOGETHER APPLIED TO THE SAME IMAGE
- ☑ CORRECTION PROCESS IS PERFORMED TO ALL IMAGES

LAYOUT
- ☑ WHEN PRINTING WITH FRAME IS SELECTED, TRIMMING IS ALWAYS PERFORMED
- ☐ MARGIN IS MADE MINIMUM WHEN PRINTING WITH FRAME IS SELECTED
- ☑ FILE NAME IS PRINTED AT THE TIME OF INDEX PRINT

PRINT

| | |
|---|---|
| PRINTING NUMBER OF COPIES | 1 NUMBER |
| RUN-OVER AMOUNT WHEN ALL SURFACE PRINTING WITH FRAMELESS | LARGE ▼ |
| PRINTING QUALITY | NORMAL SETTING ▼ |
| REARRANGEMENT | ORDER OF DATE ▼ |

[ OK ] [ CANCEL ]

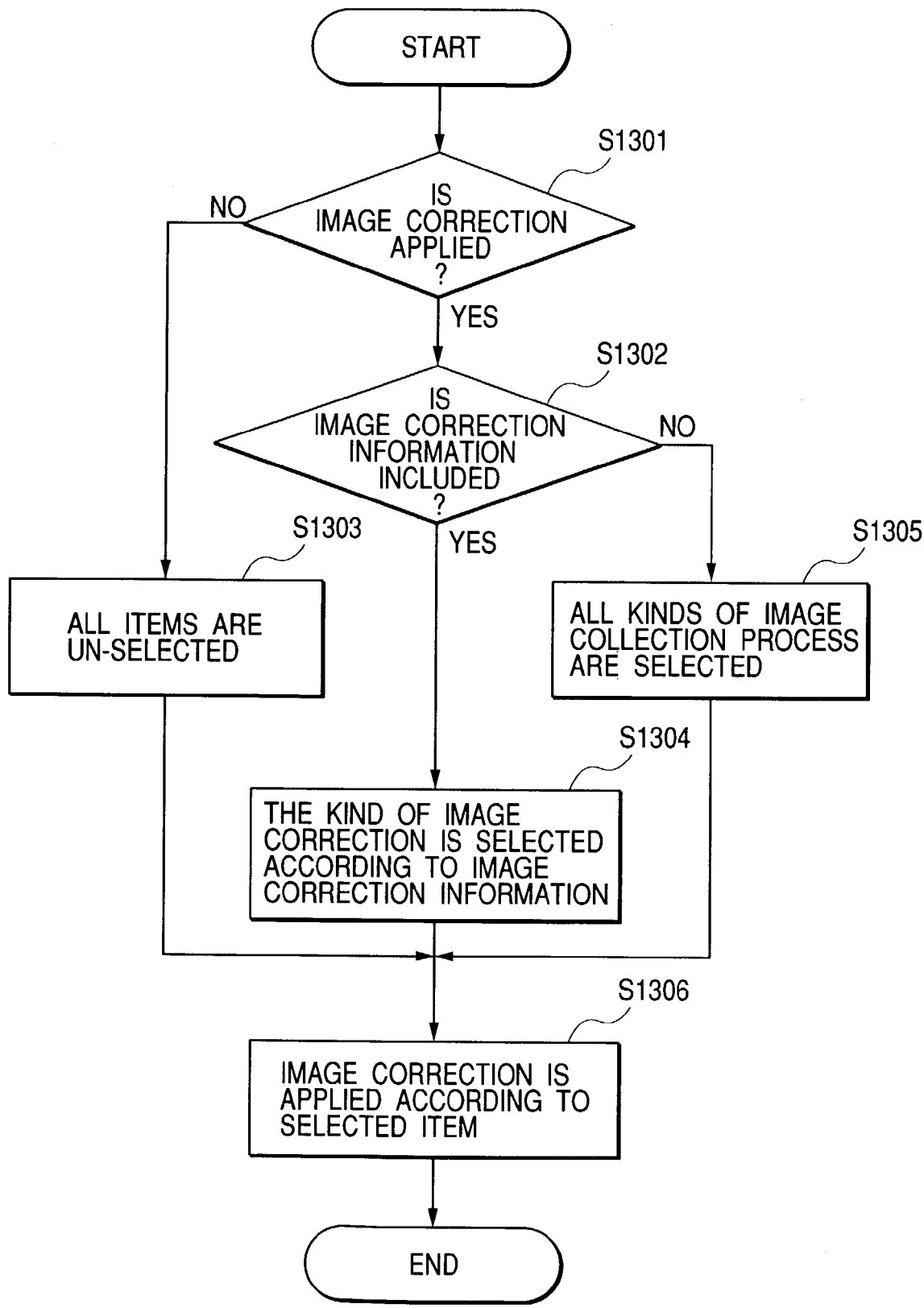

PRINTING APPARATUS, PRINTING METHOD, IMAGE PROCESSING APPARATUS, IMAGE PROCESSING METHOD, STORAGE MEDIUM, AND PROGRAM

BACKGROUND OF THE INVENTION

1. Field of the Invention

The present invention relates to a printing method, a printing apparatus, storage medium, and a program for printing an image selected by a user.

2. Related Background Art

With the popularization of digital cameras, a demand for a method of easily printing a required image becomes strong. Several applications have been provided.

Each of the applications is basically constituted by the three following processes:

the process of selecting an image to be printed;

the process of setting a sheet of printing paper; and the process of setting a layout, and is devised by using a GUI to improve the operability of a user. A large number of images are displayed as thumbnails (thumbnail display) to cause the user to select an image to be printed from the thumbnails, so that the user can easily confirm the selected image. When a print layout is selected, preview display is performed by using the actually selected image as an object for printing, so that the user can easily image a print result.

However, in conventional applications, only one page of a layout is displayed. The conventional applications do not include an application in which all pages are displayed as thumbnails to cause a user to roughly observe a printed image.

In addition, the following application is present. That is, in order to roughly observe a layout print preview, a preview image of one page is displayed together with the page number of a print page, and the page number is selected to make it possible to see a necessary page. However, since the respective pages are not displayed as thumbnails, a user cannot overlook an image printed on a specific page, and must disadvantageously print an image while imaging a printed image.

In particular, when a user tries to change a layout method in the middle of a printing operation, the user must inconveniently restart the operation.

SUMMARY OF THE INVENTION

The present invention is characterized by solving at least one of all the problems.

An aspect of the present invention is to arrange all images to be printed and to perform thumbnail display of all pages to roughly observe printed image.

Another aspect of the present invention is to make it possible that a user easily recognizes a plurality of printed images.

Still another aspect of the present invention is to make it possible that a user performs desired image correction or the like to a plurality of printed images while recognizing the printed images.

In order to realize the above aspects, according to the present invention, there is provided a printing apparatus including:

printing object selection means for selecting an image to be printed from images in a storage medium;

layout selection means for selecting a print layout;

result display means for displaying a plurality of pages as print result depending on the layout selected by the layout selection means;

page selection means for selecting an arbitrary page of the pages of print result displayed by the print result display means; and detail display means for displaying details of display of the page selected by the page selection means.

Still another aspect of the present invention will be apparent from the following embodiments and description of drawings.

BRIEF DESCRIPTION OF THE DRAWINGS

FIG. 12 is a diagram showing an outline of an option setting screen in the second embodiment.

FIG. 13 is a flow chart showing a flow of an image correction process in an embodiment.

DESCRIPTION OF THE PREFERRED EMBODIMENTS

First Embodiment

Figure 1:
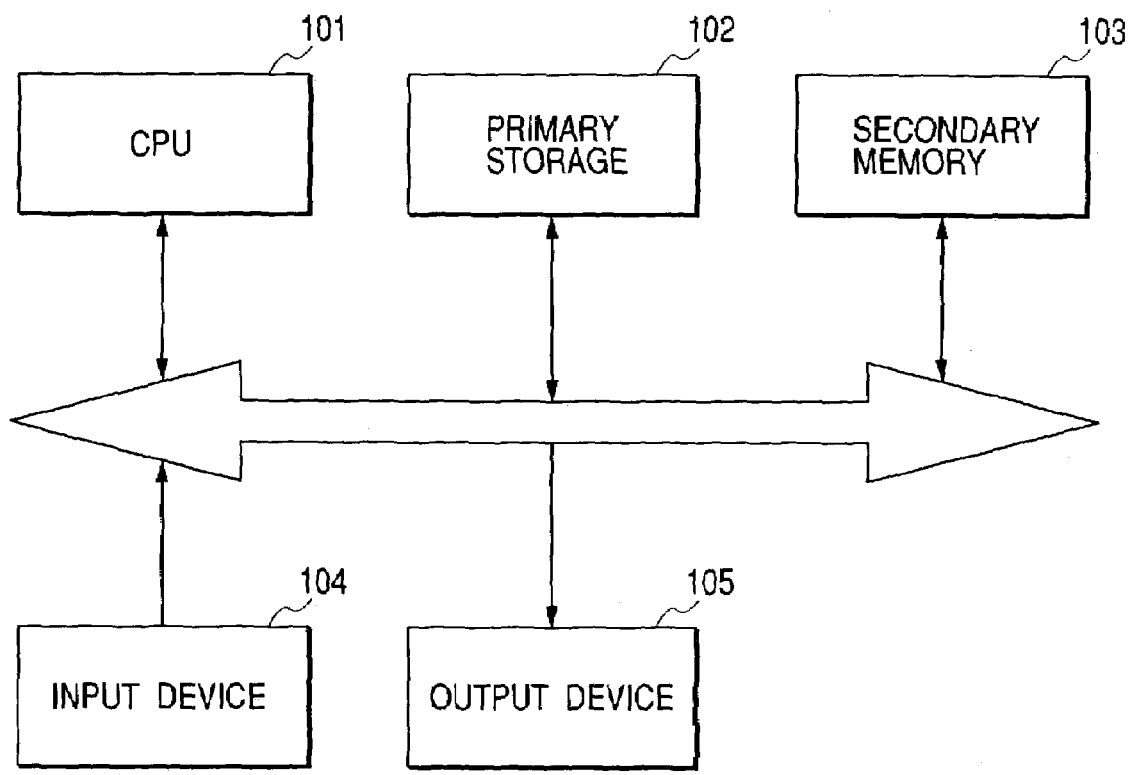
FIG. 1 is a diagram showing a system configuration according to an embodiment.

The present invention will be described below with reference to the accompanying drawings. FIG. 1 is a diagram showing an outline of a system for realizing this embodiment. A CPU 101 controls an operation of an entire system and performs execution of a program stored in a primary storage 102 or the like.

The primary storage 102 is mostly a memory, and reads a program or the like stored in a secondary memory 103 and stores the program. The secondary memory 103 corresponds to, e.g., a hard disk or the like. In general, the capacity of the primary storage is smaller than that of the secondary memory, and a program, data, and the like which cannot be stored in the primary storage because the primary storage is full are stored in the secondary memory. Data and the like which must be stored for a long period are stored in the secondary memory. In this embodiment, the program is stored in the secondary memory 103 and loaded on the primary storage 102 in execution of the program, and the CPU 101 performs an execution process.

An input device 104 corresponds to, e.g., a mouse, a keyboard, or the like. The input device 104 is used to transmit an interrupting signal to a program or the like.

As an output device 105, e.g., a monitor, a printing apparatus, or the like is considered. This apparatus requires at least printer for the character of the printing apparatus. However, as a matter of course, a device except for a printer may be used as an image output device. In addition, as a method of constituting the apparatus, various methods may be applied. However, since the method is not the trunk of the present invention, a description thereof will be omitted.

An outline of a printing apparatus according to this embodiment will be described below. In the printing apparatus described in this embodiment, a printing object image, printing object media, and a layout are designated by a GUI. In addition, the printing apparatus according to this embodiment has an edit function for simply editing a printing object image.

The above function will be described below with reference to the drawings.

Figure 2:
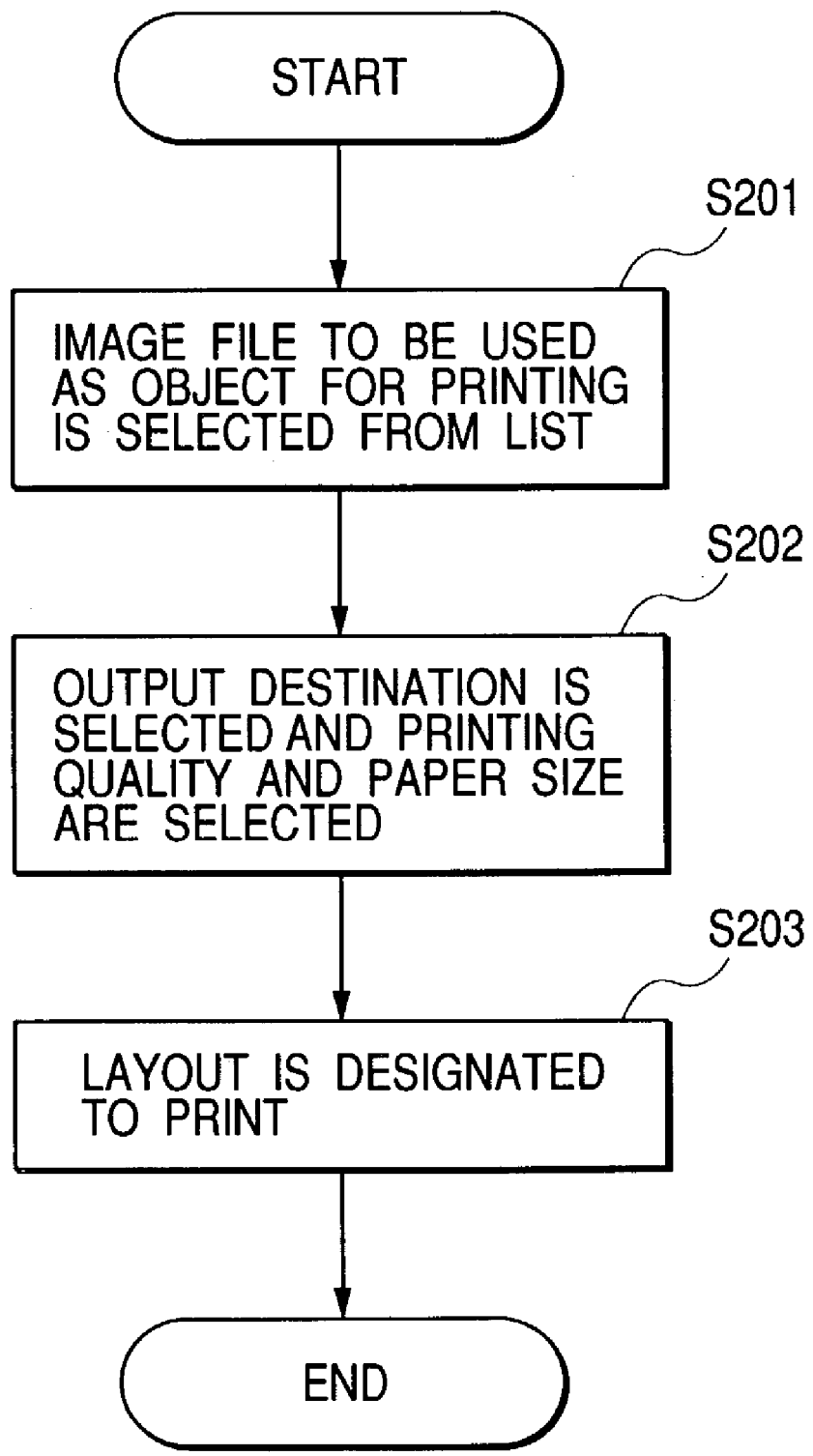
FIG. 2 is a flow chart showing a flow of a print procedure in an embodiment.

FIG. 2 is a flow chart showing a basic flow of an operation procedure of the printing apparatus according to this embodiment.

An image to be printed is selected from a large number of reduced images (thumbnail images) displayed in step S201. A printer to which image data is output and a printing sheet of paper in step S202. Finally, the layout is determined and printed in step S203. The control is moved to an edit screen by depressing a button prepared on the screen in step S203 to perform simple edition. After the edition, the control returns to the screen in step S203. Realized operations in the respective steps will be described below with reference to the drawings.

Figure 3:
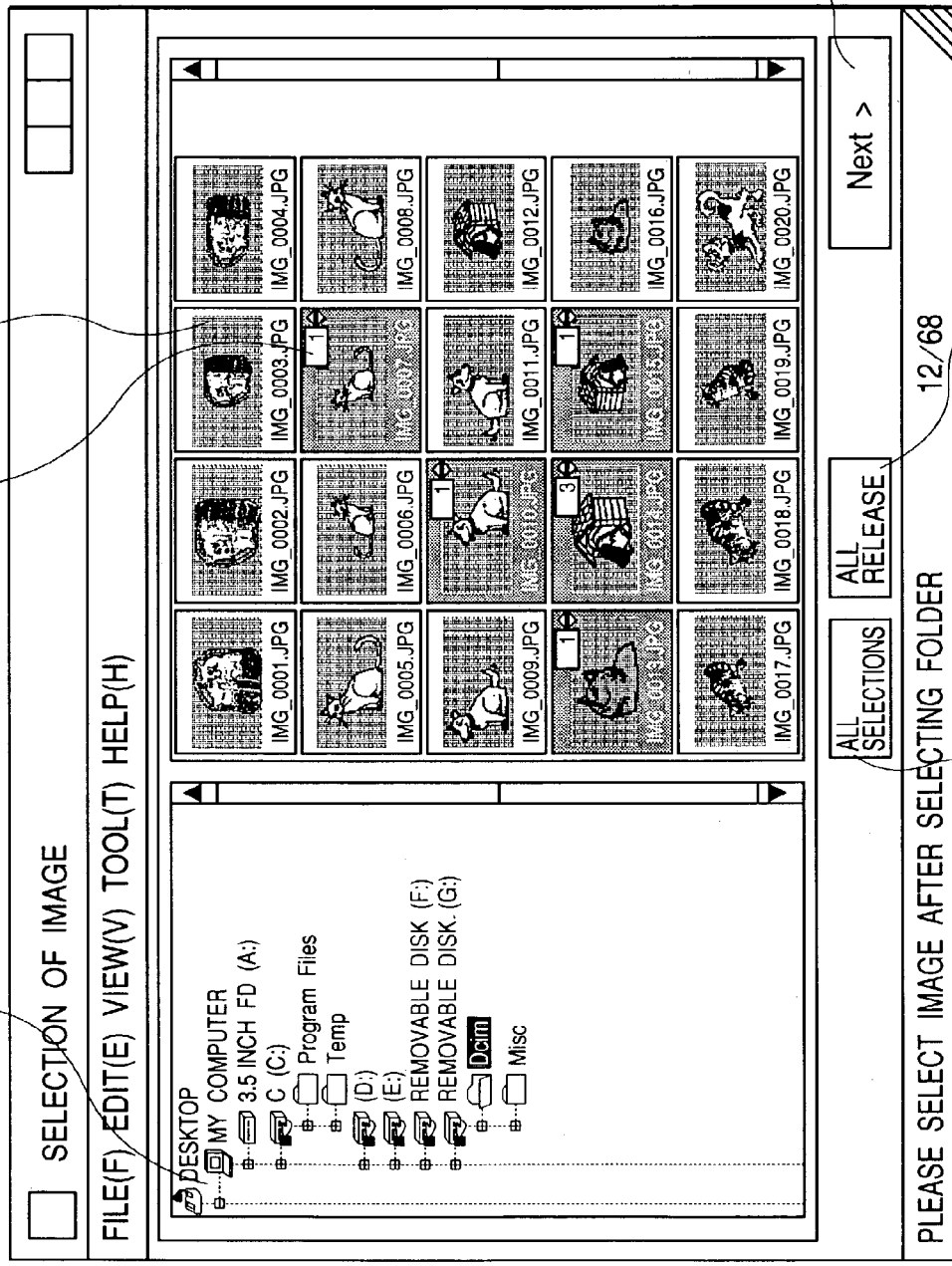
FIG. 3 is a diagram showing an outline of an image selection screen in the first embodiment.

FIG. 3 is a diagram showing an outline of a printing object designation screen in S201 according to this embodiment.

A folder tree window 301 shows a tree representing a directory structured in storage media included in the printing apparatus. A user tracks this tree, so that the user can select a directory in which necessary data is stored.

When an image file is stored in the selected directory, the thumbnail image (reduced image) of the image file is displayed on a thumbnail viewing window 303. When the user selects an image, an icon, for designating the number of sheets, representing the number of sheets and an up/down mark is displayed at the right shoulder of the thumbnail image. The user designates the icon for designating the number of sheets, so that the user can designate the number of sheets for each image. When the number of sheets is 1, the "down" mark of the icon for designating the number of sheets is selected, the icon for designating the number of images is set in a nondisplay state to release the corresponding image from print designation.

When an all selection button is depressed, all the images stored in the directory selected by the folder tree window are set in a print designation state one by one. When an all release button is depressed, all the images are released from print designation. When a selection image determination button 306 is depressed, the control shifts to a printing object media designation screen.

In the specification of this embodiment, each of all the images stored in the directory selected by depressing the all selection button are designated to be printed. However, a specification in which the number of all images designated to be printed is increased by 1 may be employed.

Figure 4:
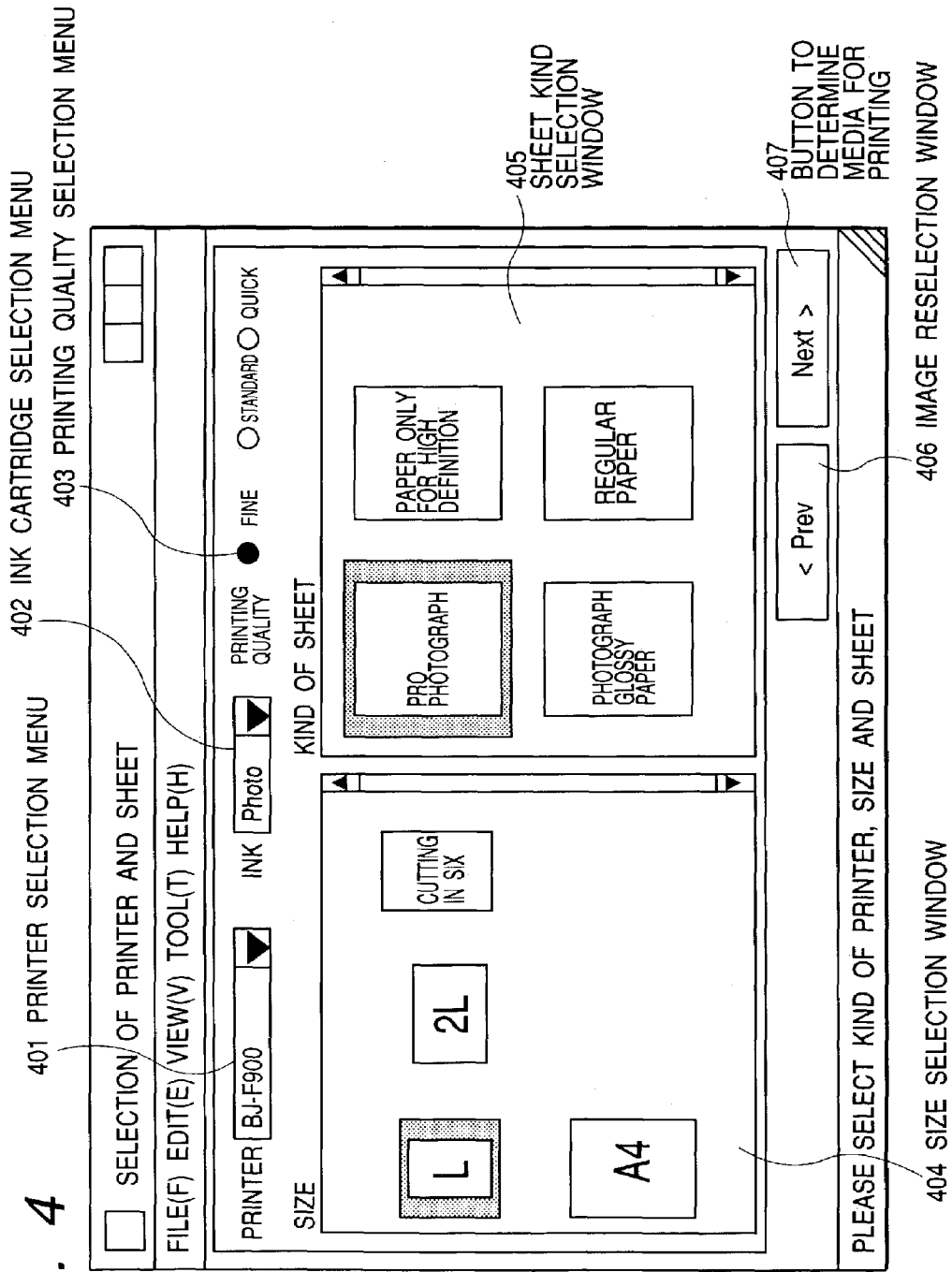
FIG. 4 is a diagram showing an outline of an output media selection screen in the first embodiment.

FIG. 4 is a diagram showing an outline of a printing object media designation screen in this embodiment.

A printer selection menu 401 is a menu for selecting a printer serving as an output destination. The printer selection menu in the present invention is a pull-down menu, and shows printers connected to the printing apparatus as a list.

Depending on the machine type of a destination printer selected by the printer selection menu, alternatives displayed on an ink cartridge selection menu 402 and a printing quality selection button 403 are limited to appropriate alternatives. When the alternatives are limited as described above, a user can perform print designation without being aware of a printer and an ink corresponding thereto.

A print size displayed on a size selection window is limited to alternatives selected depending on the type of a destination printer. In addition, depending on a selected paper size, alternatives of a sheet of paper displayed on a sheet kind selection window 405 are limited.

Therefore, each time a destination printer is changed, the states of an ink selection menu, a printing quality selection button, a printing size selection window, and a sheet kind selection window are updated. Each time a printing size selected on the printing size selection window is changed, the states of the ink selection menu, the printing quality selection button, and the sheet kind selection window are updated.

When the above-mentioned GUI is used, a user designates an output destination on the printer selection menu and can easily designate printing object media by selecting the ink selection menu, a printing quality selection menu, and icons displayed on the size selection window and the sheet kind selection window.

When a button to determine a medium (media) for printing 407 is depressed, the control shifts to a layout designation screen. When an image reselection button 406 is depressed, the control returns to the printing object image designation screen.

In this embodiment, the first alternative of the list is selected in advance in the first use of the printing apparatus, and an alternative finally selected by a user is selected in advance in the second and subsequent operations of the printing apparatus. In this manner, the following advantage can be achieved. That is, even a user who uses only fixed media need not designate printing object media again each time the printing operation is started.

Figure 5:
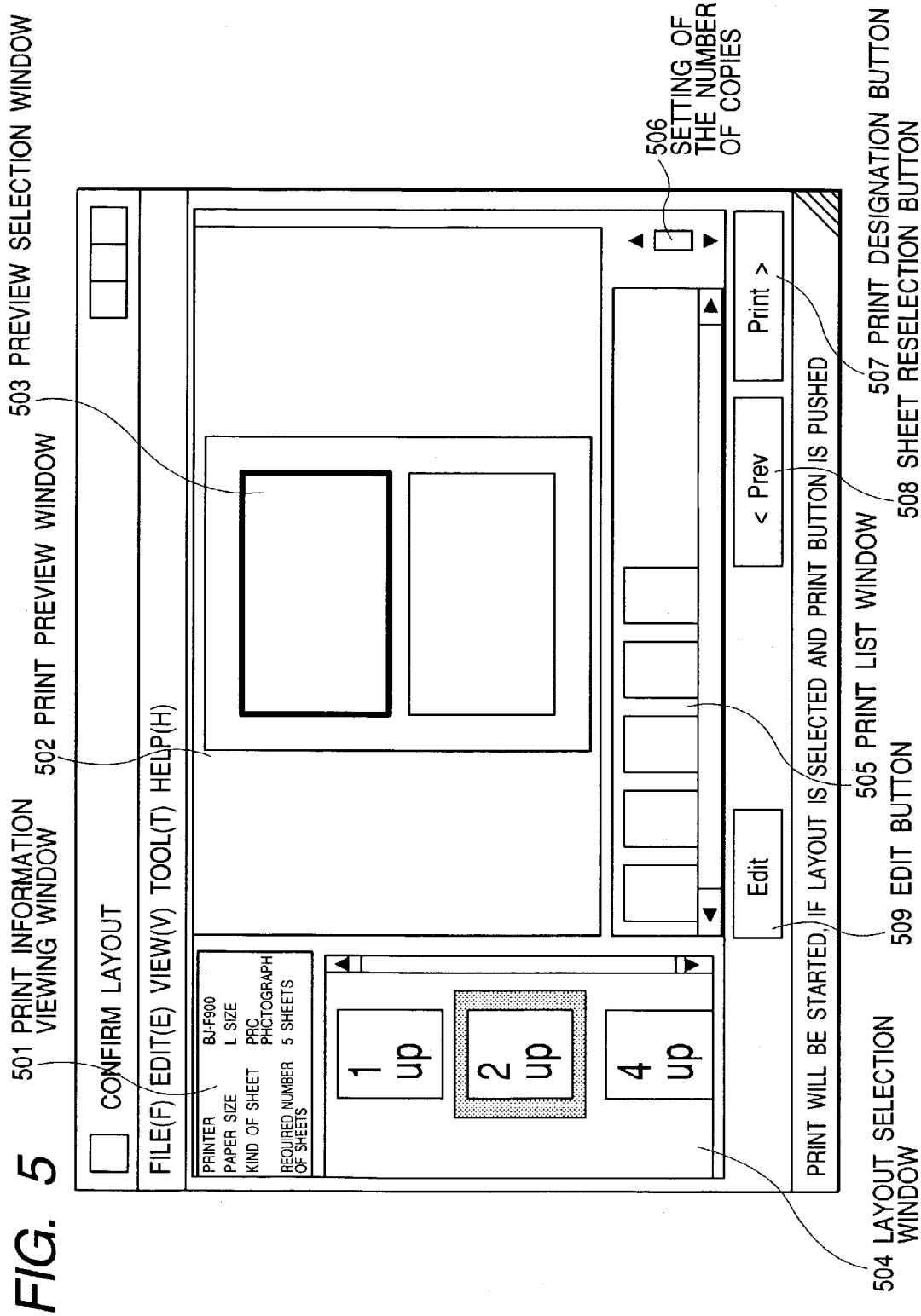
FIG. 5 is a diagram showing an outline of a layout selection screen in the first embodiment.

FIG. 5 is a diagram showing an outline of a layout designation screen.

In the layout designation screen according to this embodiment, alternatives of a layout depending on a printing object image and printing object media designated by the printing object image designation screen and the printing object media designation screen are displayed on a layout selection window 504. A print preview list is displayed on a print list window 505 depending on a layout selected on the layout selection window, and the preview of a page selected on the print list window is displayed on a print preview window 502.

A preview image displayed on the print preview window can be selected by using a mouse or the like. The image selected in this manner is displayed together with a frame by a preview selection window 503. A user depresses an edit button 509 to move the control to the edit screen, so that the user can simply edit an image selected on the preview selection window. An outline of the simple edit screen will be described later.

A user can always arbitrarily select the alternatives of the layouts displayed on the layout selection window while a layout setting screen is displayed. When the selected layout is changed, pieces of information of the print list window and the print preview window are updated into displays corresponding to the changed layout. As a page displayed on the print preview window, a page including an image selected by the preview selection window is shown. In an initial state of the layout designation screen, a state in which the first image of the printing object images is selected on the preview selection window is set.

In this manner, a user can preview an output result depending on a layout, can check a print list obtained when several layouts are used, and can easily select an optimum layout by trial and error.

On the layout designation screen, as on the printing object media designation screen, when the same printing object media as the printing object media designated when the printing apparatus is proximally started are selected, a layout which is proximally started and selected is determined as a layout in the initial state.

The number of copies is designated by the menu of a setting of the number of copies 506. A number displayed at the center is the number of copies. The number of copies is designated by arrow buttons, which are vertically arranged. When the arrow button "up" is depressed, the number of copies is increased by 1. When the arrow button "down" is depressed, the number of copies is decreased by 1. Note that the number of copies does not smaller than 1.

When a print designation button 507 is depressed, a printing operation is executed to complete all the processes.

Figure 6:
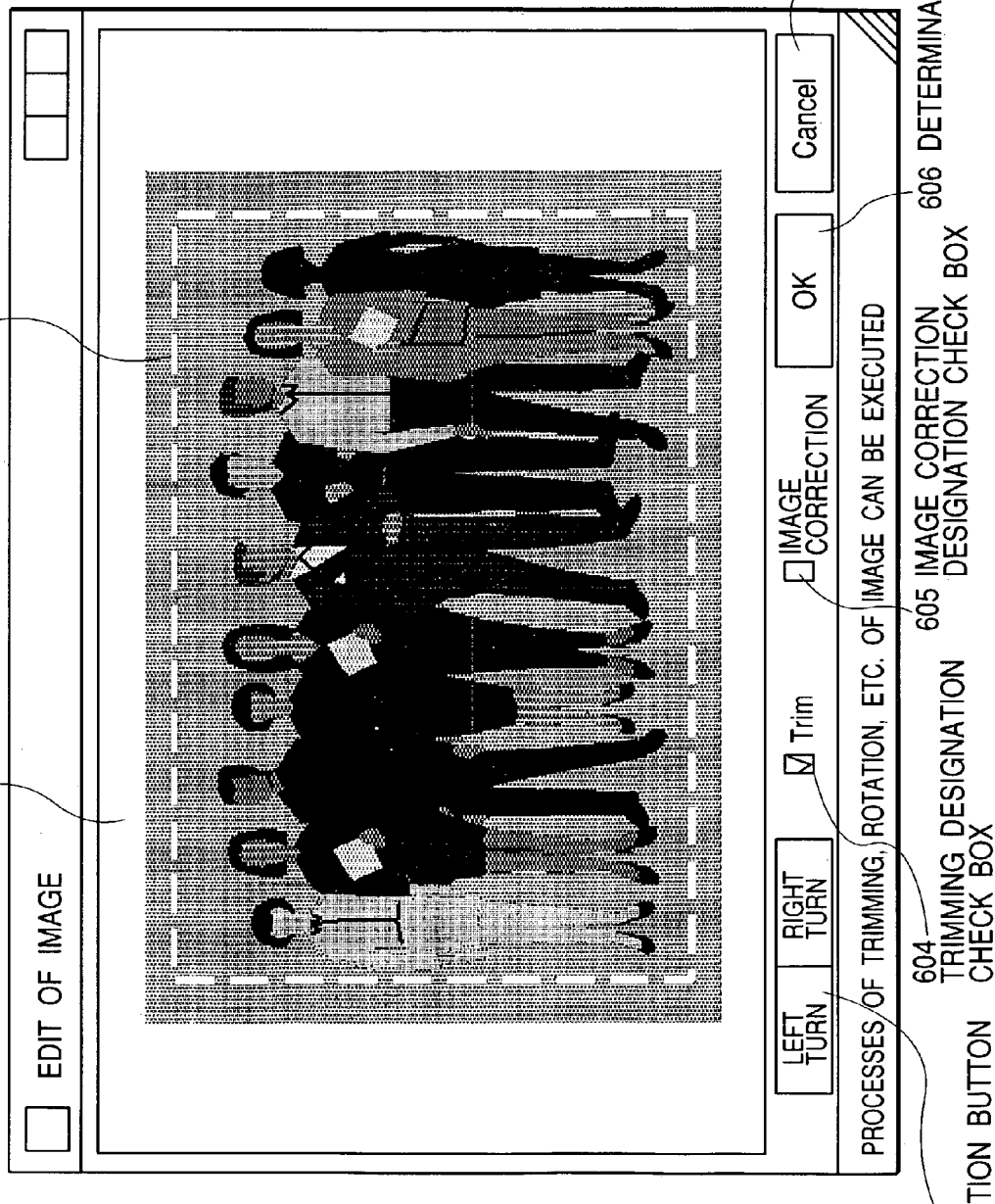
FIG. 6 is a diagram showing an outline of an image edit screen in the first embodiment.

FIG. 6 is a diagram showing an outline of a simple edit screen according to this embodiment.

An image viewing window 601 displays an image selected on the preview selection window 503. The image viewing window shows a trimming area viewing window 602 having a square shape having a horizontal to vertical ratio depending on the printing object media. The trimming area viewing window is a trimming area. On the trimming area viewing window, a size and a position can be changed by a pointing device such as a mouse. Rotation of an image is executed by a rotating button 603. In this embodiment, the image is rotated to the right by 90° in clockwise rotation, and the image is rotated to the left by 90° in counterclockwise rotation. Also on the trimming area viewing window, a display position is changed depending on the rotation.

When the check in a trimming designation check box 604 is removed, trimming is canceled. When the check in an image correction designation check box 605 is removed, color correction of a printing object image is canceled. The details of the flow of the image correction process will be described later.

When a determination button 606 is depressed, preview images displayed on the print preview window and the print list window are updated on the basis of a simple edit result to reflect the updated images on an output to a printer. When a cancel button 607 is depressed, the control returns to the layout selection screen without applying any change.

FIG. 13 is a flow chart showing the flow of the image correction process. In step S1301, it is determined whether the image correction process is applied or not by determining whether the image correction designation check box 605 is checked or not. In a setting in which the correction process is not applied, the control shifts to step S1303, and all correction items are set in non-selection states. When the correction process is applied, it is checked in step S1302 whether an image file serving as an object includes image correction information or not. When the image file includes the image correction information, the control shifts to step S1304 to select the kind of an image correction process to be applied depending on the contents of the image correction information recorded together with the image. The image correction information includes, e.g., a photographing mode, an exposure mode, an exposure time, a white balance mode, and the like in an image photographing state, and is recorded on the header of the image as attribute information of the image.

When the image file does not include the image correction information, or when the image file cannot use attribute information because the attribute information is not based on a predetermined format, the control shifts to step S1305 to perform all image correction processes, which can be performed by this apparatus by a predetermined process. All the processes are not performed, and a setting may be performed such that an appropriate process is performed by setting a program.

In this embodiment, all correction items are selected for an image file that is not based on a predetermined are selected. However, only necessary items may be automatically selected by analyzing color information or the like of an image, as a matter of course.

Finally, in step S1306, image correction depending on the correction item selected in steps S1303 to S1305 are applied, and the process is ended.

According to the printing apparatus described above, an optimum layout is easily determined while checking a preview, so that a printing operation can be executed.

Since rough arrangement of all the pages can be checked as a print list together with the preview, an operation for checking all the pages while switching the pages for checking the pages can be omitted.

Second Embodiment

In the specification of the printing apparatus according to the first embodiment, three designating operations of a printing object image, printing object media, and a layout are sequentially executed. However, the order of the designating operations of the printing object image and the printing object media is not necessarily fixed. When a process performed when a layout is not designated is added, a specification in which the execution order of the three functions is not fixed may be employed. In this embodiment, in addition to the specification described in the first embodiment, an example realized by a GUI having a function of directly jumping each of the three steps will be described below.

Figure 7:
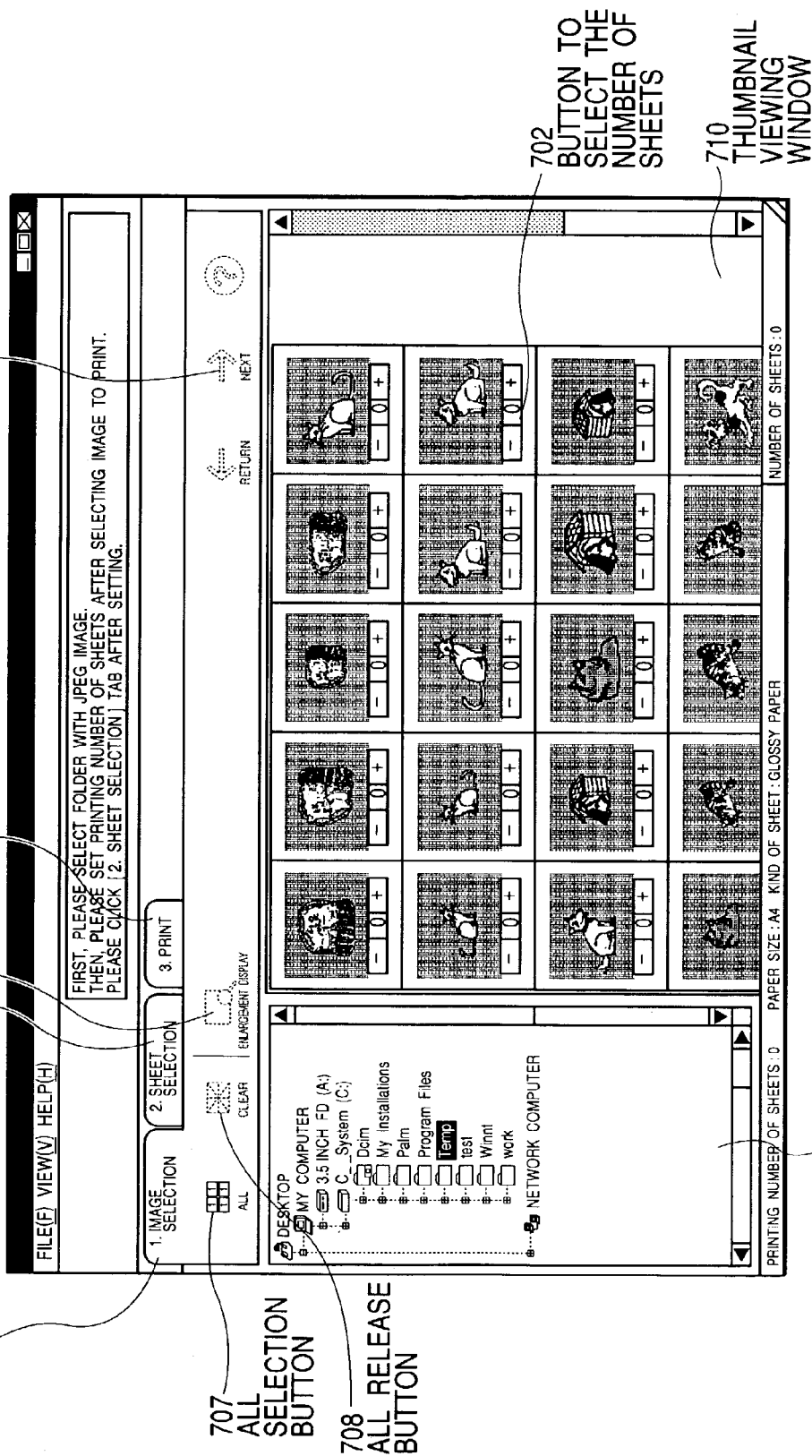
FIG. 7 is a diagram showing an outline of an image selection screen in a second embodiment.

FIG. 7 is a diagram showing an outline of a printing object image designation screen according to this embodiment. A folder tree window 709 shows a tree representing a directory structured in a storage medium, included in a printing apparatus. A user tracks this tree, so that the user can select a directory in which necessary data is stored. When an image file is stored in the selected directory, the thumbnail image (reduced image) is displayed on a thumbnail viewing window 710.

Figure 10:
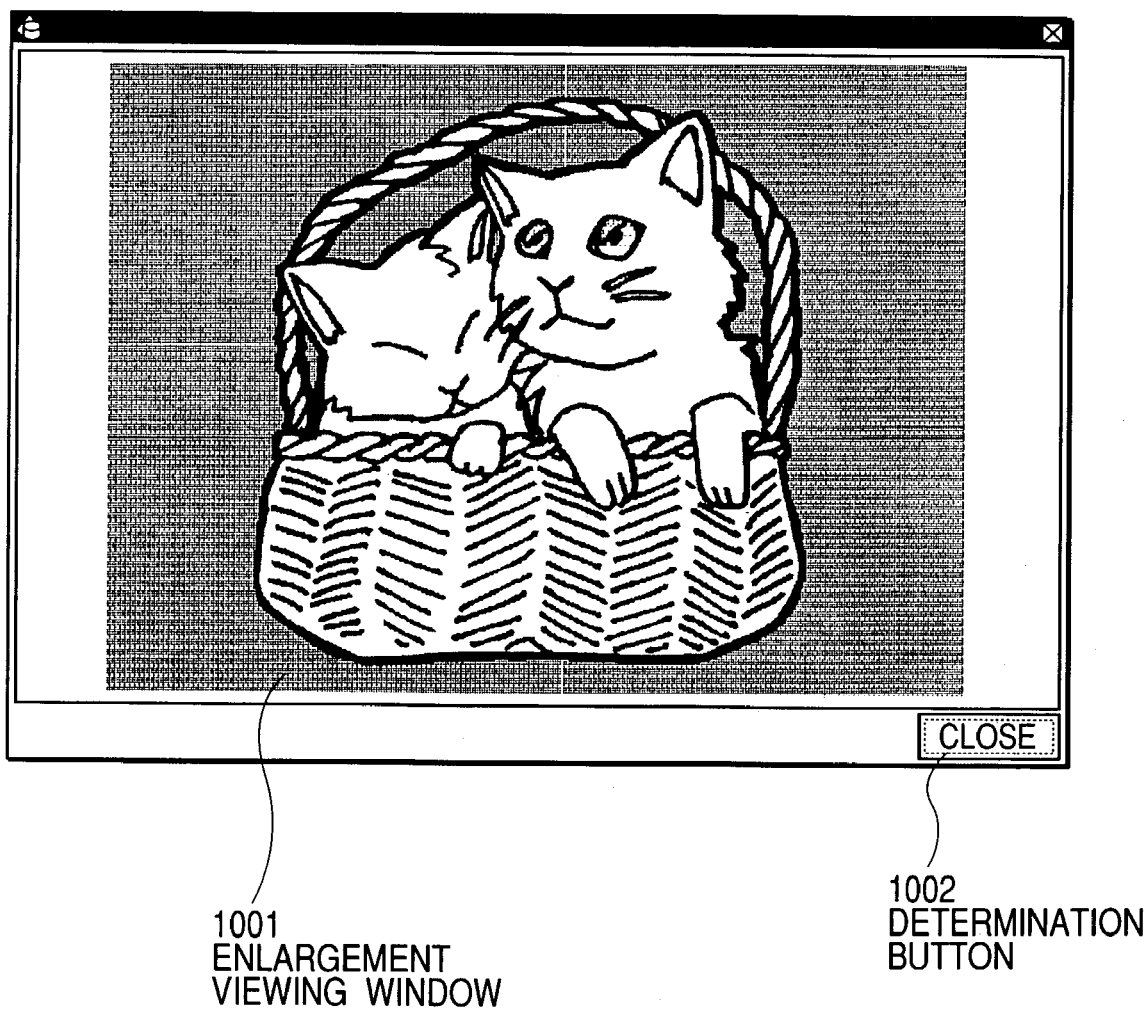
FIG. 10 is a diagram showing an outline of an enlargement display screen in the second embodiment.

When an enlargement display button 705 is depressed while an image is selected on the thumbnail viewing window, an enlargement viewing window shown in FIG. 10 is displayed. A user can check the details of an image to be selected by the enlargement viewing window. When a determination button 1002 of the enlargement viewing window is depressed, the enlargement viewing window is closed.

In this embodiment, the number of sheets is selected by a button to select the number of sheets 702. The button to select the number of sheets is a seesaw switch. When the right of the button to select the number of sheets 702 is depressed, the designated printing number of sheets displayed at the center of the button to select the number of sheets is increased by 1. When the left of the button to select the number of sheets 702 is depressed, the designated printing number of sheets is decreased by 1. When the designated printing number of sheets becomes 0, the left of the button to select the number of sheets is made invalid. When the designated printing number of sheets becomes 99, the right of the button to select the number of sheets is made invalid.

When an all selection button 707 is depressed, a state in which each of all the images stored in the directory selected on the folder tree window is designated to be printed is set. When an all release button 708 is depressed, print designation of all the image is released. When a selected image determination button 706 is depressed, the control shifts to the printing object media designation screen.

When the directory includes an image file in which the designated printing number of sheets is 1 or more, a sheet selection tab 703 and a print tab 704 are made valid. When the directory includes no image file in which the designated printing number of sheets is 1 or more, the sheet selection tab 703 and the print tab 704 are made invalid. When the sheet selection tab 703 is depressed, the control shifts to the printing object media designation screen. When the print tab is depressed, the control shifts to the layout designation screen. As in the first embodiment, when the selected image determination button 706 is depressed, the control shifts to the printing object media designation screen.

Figure 8:
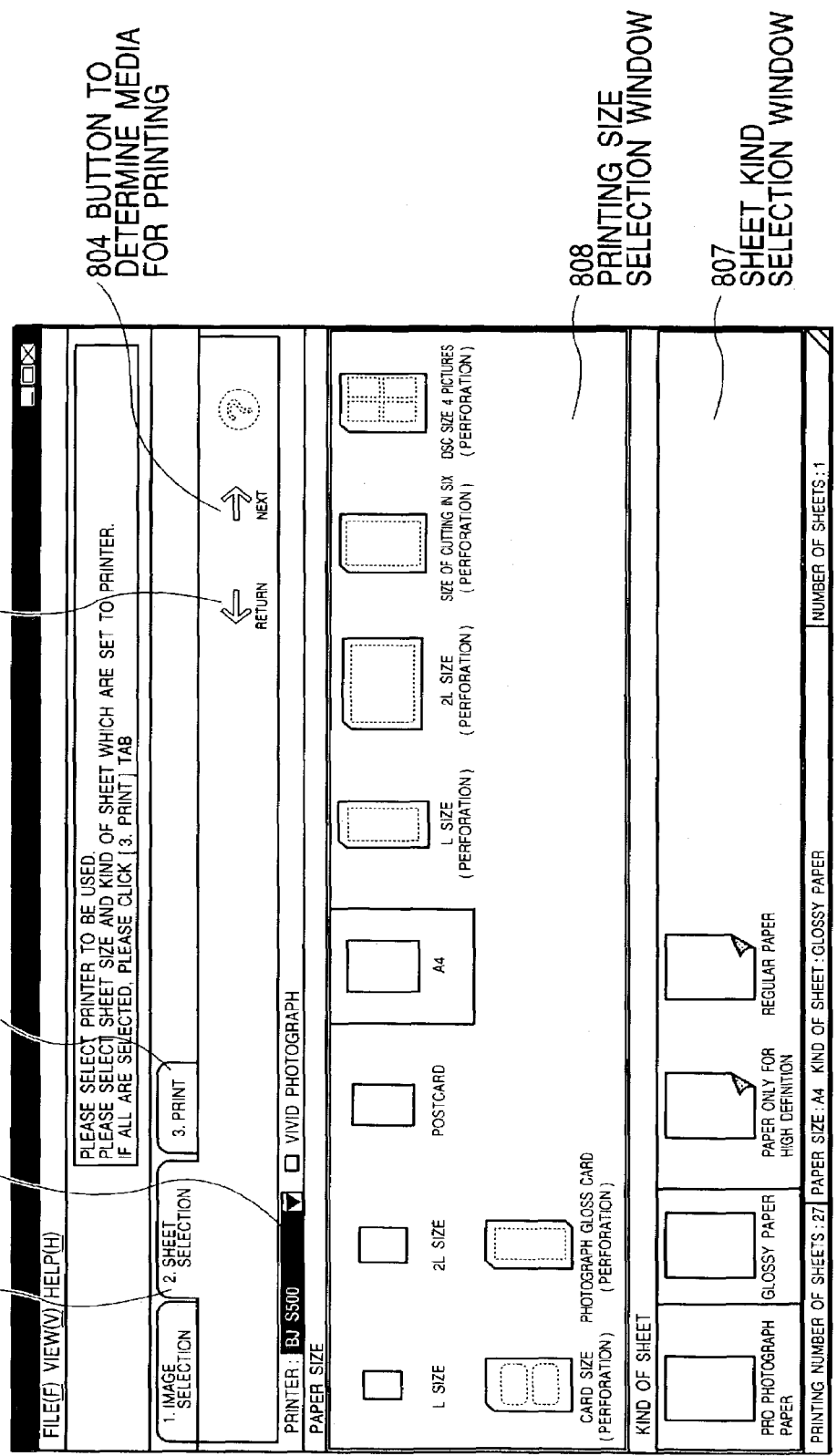
FIG. 8 is a diagram showing an outline of an output media selection screen in a second embodiment.

FIG. 8 is a diagram showing an outline of a printing object media designation screen in this embodiment. A printer selection menu 806 is a menu for selecting a printer serving as a destination. The printer selection menu in this embodiment is a pull-down menu, and shows printers connected to the printing apparatus as a list. A check box in which "VIVID PHOTO" is written on the right side of the printer selection menu is a check box for designating whether a special process prepared by a printer driver is applied or not. Only when a "VIVID PHOTO" function is valid in a printer selected by the printer selection menu, this check box is valid. A VIVID PHOTO function is cited as an example of the special process provided by the printer driver in this embodiment. However, another process can be applied without any problem.

Depending on the machine type of a destination printer selected by the printer selection menu, alternatives displayed on a printing size selection window 808 and a sheet kind selection window 807 are limited to appropriate alternatives. When the alternatives are limited as described above, a user can perform print designation without being aware of a printer and a sheet of paper corresponding thereto. In addition, depending on a paper size selected on the printing size selection window, alternatives of sheets are displayed on the sheet kind selection window. Therefore, each time the destination printer is changed, the states of the printing size selection window and the sheet kind selection window are updated. Each time the paper size is changed, the state of the sheet selection window is updated.

An ink cartridge designation menu and a print quality menu are prepared in the first embodiment, and an ink cartridge selection menu in this embodiment is displayed only when a predetermined printer is selected. A function corresponding to the printing quality selection button in the first embodiment is designated on a selection screen to be described later.

When a button to determine media for printing 804 or a sheet selection tab 802 is depressed, the control shifts to the printing object image designation screen. When an image reselection button 805 or a print tab 803 is depressed, the control shifts to the layout designation screen.

As in the first embodiment, the first alternative of the list is selected in advance in the first use of the printing apparatus, and the alternative finally selected is selected in advance in the second use of the printing apparatus.

Figure 9:
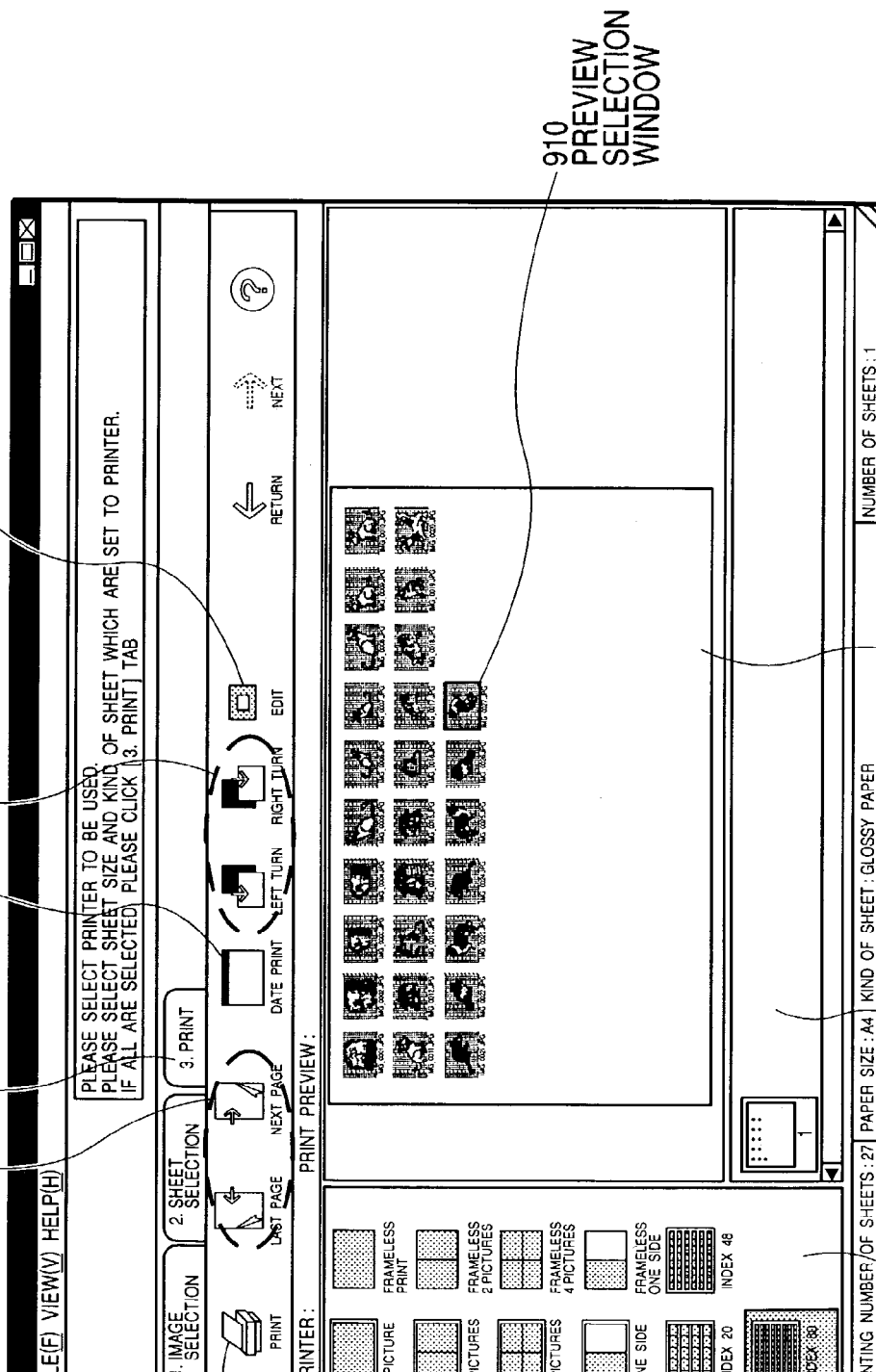
FIG. 9 is a diagram showing an outline of a layout selection screen in the second embodiment.

FIG. 9 is a diagram showing an outline of a layout selection screen in this embodiment.

On the layout designation screen in this embodiment, a printing object image designated on the printing object image designation screen and the printing object media designation screen and a layout depending on the printing object media are displayed on the layout selection window 907, and a print preview list is displayed on a print list window 908 depending on the layout selected on the layout selection window. The preview of a page selected on the print list window is displayed on a print preview window 909.

As in the first embodiment, a user can arbitrarily select a layout displayed on the layout selection window. When the selected layout is changed, pieces of information of the print list window and the print preview window are updated. A page displayed on the print preview window displays a page including an image selected on the preview selection window. In the initial state of the layout designation screen, a state in which the first image of the printing object images is selected on the preview selection window is set.

Even on the layout designation screen, as on the printing object media designation screen, when the same printing object media as the printing object media designated in the proximate operation is selected, a layout proximally operated and selected is used as a layout used in an initial state.

A preview image displayed on the print preview window can be selected and operated by using a mouse or the like. The image selected as described above is displayed together with a frame on a preview selection window 910. The user depresses an edit button 906 to move the control to an edit screen shown in FIG. 11, so that the image selected on the preview selection window can be simply edited. An outline of a simple edit screen will be described below.

In the first embodiment, a rotation button is included in the simple edit screen. However, in this embodiment, the rotation button is arranged on the layout selection screen. When a rotation button 905 is depressed, an image is turned to the right or the left by 90° depending on the depressed button. As the center point of the rotation, a point that is close to a center of an area displayed on the print preview window as much as possible is selected. The image is circumscribed to the print area in the initial state while keeping the aspect ratio of the image. More specifically, the image is arranged not to form a blank in the print area. It can be designated by a setting screen (to be described later) whether an image to be printed is circumscribed or inscribed to the print area.

When a date print button 904 is depressed, dates are added to the images on the print list window and the print preview window to update the display. When the data print button is depressed again, the date displays are canceled to update the display. However, the date print button is invalid when the layout is designated for index printing, and a date is not always added. In this embodiment, although date display is not performed in index printing, date printing may be applied regardless of the type of the layout as a matter of course.

A skip button 902 is a button for changing a current page on the print list window, and updates the display of the print preview window with the depression of the button. In this case, an image selected on the preview selection window is changed into the first image of the changed current page.

As in the first embodiment, when a sheet reselection button is depressed, the control returns to the printing object media designation screen. When the image selection tab is depressed, the control shifts to the printing object image selection screen. When the sheet selection tab is depressed, the control shifts to the printing object media selection screen.

Figure 11:
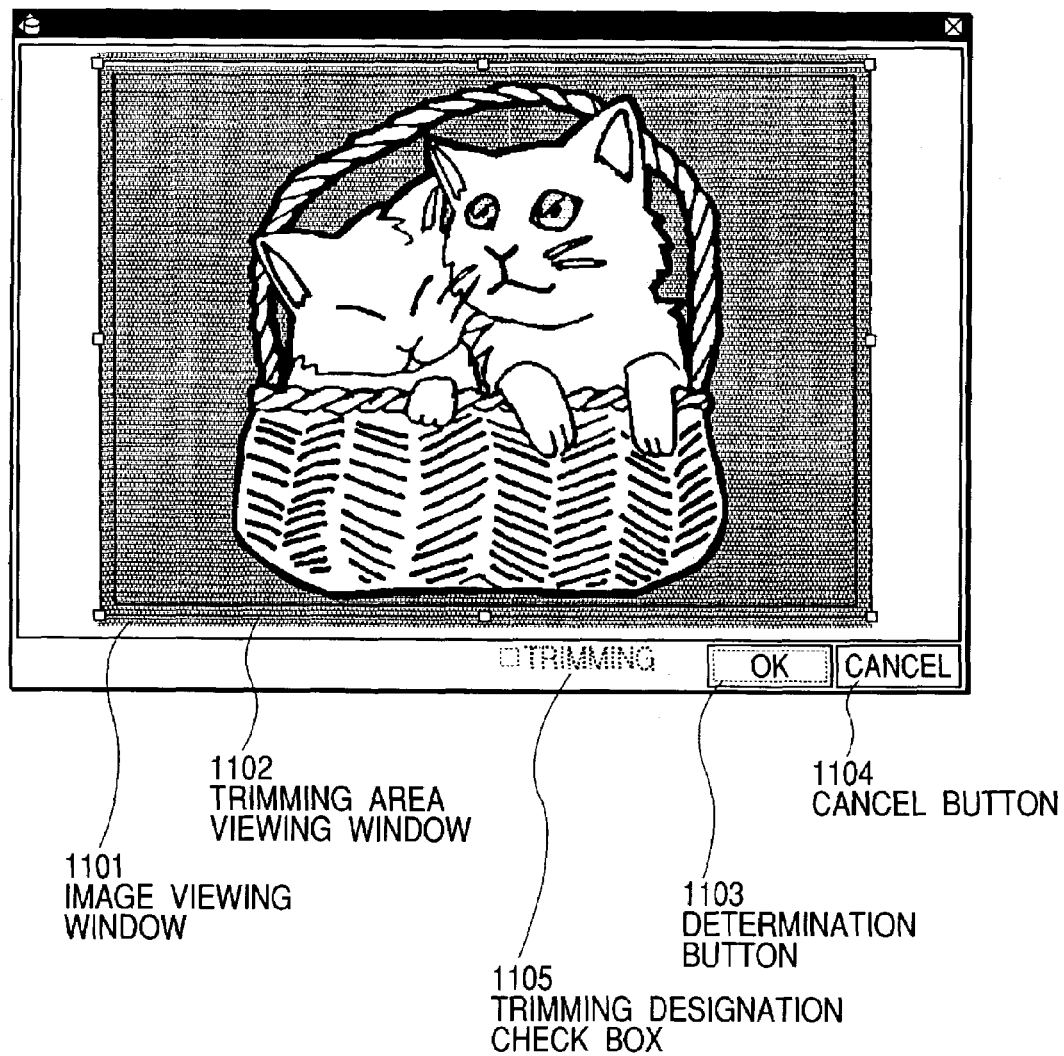
FIG. 11 is a diagram showing an outline of a trimming designation screen in the second embodiment.

FIG. 11 is a diagram showing an outline of a simple edit screen in this embodiment. On an image viewing window 1101, an image selected on the preview selection window is displayed. In the image viewing window, a trimming area viewing window 1102 having a square shape having a horizontal to vertical ratio depending on the printing object media is viewed. The trimming area viewing window is a trimmed area. The trimming area viewing window can be changed in size and position by a pointing device such as a mouse.

The trimming area viewing window in FIG. 11 has a double square frame. Since the entire designated area of an image cannot be printed by some printers, the image is printed such that the image slightly runs over, so that frameless print may be realized. In this case, the trimming area is different from an area, which is actually printed on a sheet of paper. Of the double frame in FIG. 11, the outer frame shows a trimming area, and the inner frame shows an area that is actually printed on a sheet of paper. When frameless printing is not performed, i.e., when the trimming area is equal to an actually printed area, the trimming area is displayed by using one square without using the double frame.

In the first embodiment, although it is designated on the simple edit screen whether the image correction process is applied or not, it is designated on another set screen in this embodiment. A set screen will be described later.

When the check of a trimming designation check box 1105 is removed, the trimming is canceled. As in the first embodiment, when a determination button 1103 is depressed, preview images displayed on the print preview window and the print list window are updated on the trimming result to output the images to a printer. When a cancel button 1104 is depressed, the control returns to the layout selection screen without applying any change.

FIG. 12 is a diagram showing an outline of a set screen in this embodiment.

First, a set item "image" will be described below.

An item "when images are vertically laid out" designates an image rotation direction when an image is rotated according to a print area. For example, on one picture obtained when one designated image is printed on one sheet of paper and two pictures obtained when two designated images on one sheet of paper are different from each other, the directions of the images are different from each other the sheets of paper are longitudinally held. In this case, the rotation directions of the images are designated.

A set item "edit/effect" will be described below.

An item "the same edit contents are applied to all the same images" designates whether, when rotation and trimming are applied to a plurality of designated images, the edit is applied to all output images or not. When this check is removed, even though the same files are designated, different trimming operations can be performed.

An item "correction process is performed to all images" designates whether the image correction process shown in FIG. 13 in the first embodiment is uniformly applied to all the images or not.

A set item "layout" will be described below.

An item "when framed printing is designated, trimming is always performed" designates whether an image is circumscribed or inscribed to a printable area when the aspect ratio of the printable area and the aspect ratio of the image are different from each other. When a check is in the box of the item, the image is circumscribed to the printable area. Therefore, although the image is printed on the whole of the printable area, a part of the image is not printed. In contrast to this, when the check is not in the box, the entire image is necessarily printed. However, a blank depending on the difference between the aspect ratios is formed in the printed image. In the initial state, when famed printing is selected, a setting is always made to perform trimming.

An item "when framed printing is selected, a blank is minimized" is designation which is important when a printer in which a printable area and a print guarantee area are not equal to each other is used. The printable area literally means an area in which a printer can form ink dots. The print guarantee area is an area in which it is guaranteed that printing is performed with predetermined image quality in the printable area. Depending on the sheet supply system of a printer, the two areas may be different from each other. When a check is in this box, an image to be printed is arranged in consideration of only the printable area. When a check is not in the box, the image to be printed is arranged within the print guarantee area. In the initial state, when framed printing is selected, a setting is performed such that a blank is not minimized.

An item "when index printing is performed, a file name is printed" literally means a setting for determining whether a file name is printed together with an image in index printing. In the initial state, a setting is performed such that a file name is printed in index printing.

Finally, a set item "print" will be described below. In this item, designation of the number of copies prepared on the layout designation screen in the first embodiment, a run-over size in frameless printing, printing quality, and an order of images in printing are set.

All the items set on the above set screens are reflected on the preview on the layout selection screen. Therefore, when the printing apparatus according to the present invention is used, a user can obtain the same print result as that which is seen by using the preview.

The image on which the correction designation as described in the above embodiments is reflected is preferably reflected on a thumbnail display (for example, the displays of each page of the print list window 505) serving as a simple display of a print result or an image (for example, the display on the print preview window 502) which is selected from the thumbnails and displayed in detail.

In particular, corrections such as rotating correction, a trimming process, and a designation for changing a layout position which are related to the arrangement position of an image are preferably reflected on both a thumbnail display (for example, the display of each page of the print list window 505) serving as a simple display and an image (for example, the display on the print preview window 502) selected from the thumbnails and displayed in detail.

The process such as a color correction process for an image is not preferably reflected on a thumbnail display (for example, the display of each page of the print list window 505) serving as a simple display. However, the process is preferably reflected on an image (for example, the display on the print preview window 502) selected from the thumbnails and displayed in detail.

This is because the thumbnail display (for example, the display of each page of the print list window 505) serving as a simple display is suitable for checking the arrangement of images, but is not suitable for checking detailed information in an image. Therefore, when the color correction process is purposely reflected on the images, the reflection is heavily loaded on the calculation process. This is unexpectedly inconvenient. In particular, when a plurality of images are simultaneously displayed and processed, a color correction process for all the images heavily loads on the printing apparatus. For this reason, the printing apparatus preferably employs a configuration in which it is controlled depending on the contents of the correction processes whether the thumbnail display (for example, the display of each page of the print list window 505) on which the correction result is reflected is displayed or not.

The present invention may be applied to a system constituted by a plurality of machines (for example, a host computer, an interface, a reader, a printer, and the like) or to an apparatus constituted by one machine (for example, a copying machine or a facsimile machine).

The spirit and scope of the invention also includes a configuration realized as follows. That is, to a computer in an apparatus or a system connected to various devices such that the various devices are operated to realize the functions of the above embodiment, a program code of software for realizing the functions of the embodiments is supplied, so that the various devices are operated according to the program stored in the computer (CPU or MPU) of the system or the apparatus.

In this case, the program code itself of the software realizes the functions of the embodiments described above. The program code itself and means for supplying the program code to the computer, e.g., a storage medium which stores the program code therein, constitute the present invention.

As the storage medium for storing the program code, for example, a floppy disk, a hard disk, an optical disk, a photomagnetic disk, a CD-ROM, a magnetic tape, a nonvolatile memory card, a ROM, or the like can be used.

As a matter of course, the embodiments of the present invention include the program code not only when the functions of the embodiments are realized by causing the computer to execute the supplied program code, but also when the functions of the embodiments are realized by cooperation between the program code and an OS (operating system) operating in the computer, another application software, or the like.

As a matter of course, the present invention also includes the following case. That is, the supplied program code is stored in a memory included in a function expansion board of the computer or a function expansion unit connected to the computer, and a CPU or the like mounted on the function expansion board or the function storage unit performs some or all of actual processes on the basis of the instructions of the program code. The functions of the embodiments are realized by the processes.

As described above, by using the printing apparatus according to this embodiment, when a user selects a layout, a print result is shown to the user by each page and all thumbnails. For this reason, rough observation of the print result is advantageously easy. In addition, since a thumbnail image is updated according to a setting of printer or a setting of an application, a preview that is almost the same as an actual print result can be displayed. Therefore, the user can easily image the print result advantageously.

In particular, when a user tries to change a layout method in the middle of a printing operation, the printing operation need not be restarted.

The present invention is not limited to the above embodiments, and various changes and modifications of the invention can be effected without departing from the spirit and scope of the invention.

What is claimed is:

1. A print setting apparatus for printing an image selected from among a plurality of images stored on a storage medium, comprising:
   a selecting unit for selecting an image to be subjected to printing, from among the plurality of images stored on the storage medium;
   a media selecting unit for selecting printing media; and
   a display control unit for controlling to display a layout setting screen so as to include therein a layout selection area for displaying choices of a layout corresponding to the printing media selected by said media selecting unit, a list display area for displaying a list of printing preview of a plurality of pages in accordance with the layout selected in the layout selection area, and a preview display area for displaying the printing preview of the page selected in the list display area, on a larger scale than the printing preview display in the list display area,
   wherein if the choice of the layout in the layout selection area is changed while the layout setting screen is being displayed, said display control unit changes the display in each of the list display area and the preview display area to a display corresponding to the layout of the changed choice.

2. An apparatus according to claim 1, further comprising a preview image selection unit for selecting an image to be displayed in the preview display area, wherein in an initial display state of the layout setting screen, said preview image selection unit selects the first one of the images to be subjected to printing, and said display control unit displays pages including the image selected by said preview image selection unit, in the preview display area.

3. An apparatus according to claim 1, wherein if said media selection unit selects the printing media selected previously, said display control unit displays each of the areas included in the layout setting screen in accordance with the layout corresponding to the media selected previously in an initial display state.

4. An apparatus according to claim 1, wherein if the choice of the layout in the layout selection area is changed while said display control unit is displaying the layout setting screen, said display control unit displays, in the preview display area, the pages including the image which was selected in the preview display area before the choice of the layout is changed.

5. A control method of a print setting apparatus for printing an image selected from among a plurality of images stored on a storage medium, comprising the steps of:
   selecting an image to be subjected to printing, from among the plurality of images stored on the storage medium;
   selecting printing media; and
   controlling to display a layout setting screen so as to include therein a layout selection area for displaying choices of a layout corresponding to the printing media selected in said media selecting step, a list displaying area for displaying a list of printing preview of a plurality of pages in accordance with the layout selected in the layout selection area, and a preview display area for displaying the printing preview of the page selected in the list display area, on a larger scale than the printing preview display in the list display area,
   wherein if the choice of the layout in the layout selection area is changed while the layout setting screen is being displayed, said display control step changes the display in each of the list display area and the preview display area to a display corresponding to the layout of the changed choice.

6. A method according to claim 5, further comprising a step of selecting an image to be displayed in the preview display area,
wherein in an initial display state of the layout setting screen, said preview image selection step selects the first one of the images to be subjected to printing, and said display control step displays pages including the image selected in said preview selection step, in the preview display area.

7. A method according to claim 5, wherein if said media selection step selects the printing media selected previously, said display control step displays each of the areas included in the layout setting screen in accordance with the layout corresponding to the media selected previously in an initial display state.

8. A method according to claim 5, wherein if the choice of the layout in the layout selection area is changed while said display control step is displaying the layout setting screen, said display control step displays, in the preview display area, the pages including the image which was selected in the preview display area before the choice of the layout is changed.

* * * * *

UNITED STATES PATENT AND TRADEMARK OFFICE
CERTIFICATE OF CORRECTION

PATENT NO. : 7,277,192 B2
APPLICATION NO. : 10/357196
DATED : October 2, 2007
INVENTOR(S) : Takuya Kotani et al.

It is certified that error appears in the above-identified patent and that said Letters Patent is hereby corrected as shown below:

DRAWINGS SHEET:
Figure 13, S1305, "PROCESS" should read --PROCESSES--.

COLUMN 5:
Line 20, "smaller" should read --become smaller--.

COLUMN 6:
Line 14, "are" should be deleted.
Line 15, "selected." should read --selection.--.

COLUMN 7:
Line 11, "image" (first occurrence) should read --images--.

COLUMN 8:
Line 55, "data" should read --date--.

COLUMN 10:
Line 10, "designation" should read --a designation--.

Signed and Sealed this

Fourth Day of November, 2008

JON W. DUDAS
*Director of the United States Patent and Trademark Office*